(12) United States Patent
Anwar (10) Patent No.: US 9,710,446 B2
(45) Date of Patent: Jul. 18, 2017

(54) ENHANCED INTERNALLY LINKED ELECTRONIC PAPER FORMAT REPORT GENERATION SYSTEM AND PROCESS

(71) Applicant: Shahbaz Anwar, Houston, TX (US)

(72) Inventor: Shahbaz Anwar, Houston, TX (US)

( * ) Notice: Subject to any disclaimer, the term of this patent is extended or adjusted under 35 U.S.C. 154(b) by 465 days.

(21) Appl. No.: 14/452,371

(22) Filed: Aug. 5, 2014

(65) Prior Publication Data

US 2016/0042003 A1    Feb. 11, 2016

(51) Int. Cl.
| | |
|---|---|
| *G06F 17/30* | (2006.01) |
| *G06F 17/24* | (2006.01) |
| *G06F 17/22* | (2006.01) |
| *G06F 17/27* | (2006.01) |

(52) U.S. Cl.
CPC .......... *G06F 17/24* (2013.01); *G06F 17/2205* (2013.01); *G06F 17/2705* (2013.01)

(58) Field of Classification Search
CPC .................. G06F 3/04842; G06F 17/2247
USPC ....................................................... 707/797
See application file for complete search history.

(56) References Cited

U.S. PATENT DOCUMENTS

| | | | | |
|---|---|---|---|---|
| 5,937,155 | A * | 8/1999 | Kennedy | G06F 17/245 |
| | | | | 714/38.1 |
| 7,640,496 | B1 * | 12/2009 | Chaulk | G06F 3/067 |
| | | | | 707/999.102 |
| 9,026,935 | B1 * | 5/2015 | Rasmussen | H04L 51/04 |
| | | | | 715/764 |
| 9,244,899 | B1 * | 1/2016 | Greenbaum | G06Q 40/00 |
| 9,424,333 | B1 * | 8/2016 | Bisignani | G06F 17/30592 |
| 2007/0266327 | A1 * | 11/2007 | Ritcher | G06F 17/30017 |
| | | | | 715/751 |
| 2014/0172808 | A1 * | 6/2014 | Burge | G06F 21/6218 |
| | | | | 707/694 |
| 2015/0046389 | A1 * | 2/2015 | Dhayapule | G06F 17/30563 |
| | | | | 707/602 |

\* cited by examiner

*Primary Examiner* — Sheree Brown
(74) *Attorney, Agent, or Firm* — John Lindsay (57) ABSTRACT

The present invention is directed to a system and process for electronic paper file generation from a report format and metafile such that a user may readily navigate the report objects within an enhanced electronic paper file. An electronic paper file is created based on a selected data source and report format. The initial electronic paper file is parsed and a metafile including identifier and position information for report objects contained therein is created. The metafile is parsed to generate the relationships between the report objects and a data tree representing the relationships is created. The relationship information is parsed and internal links to related report objects are created, facilitating navigation among the report objects.

20 Claims, 13 Drawing Sheets

Fig. 9b payment (2% or 4 statements)

28

- but I would like payment plans for it.
- every item I click on says "no extended payment plans". s that because I am not eligible for payment plan yet? unfortunate that I can not do payment plans for the third line or I would have upgraded tonight.

ENHANCED INTERNALLY LINKED ELECTRONIC PAPER FORMAT REPORT GENERATION SYSTEM AND PROCESS

BACKGROUND

Field of the Invention

The present invention relates to report generation systems, more specifically to report generation systems for electronic paper file formats.

Description of the Related Art

Organizations are in need for critical intelligence to drive their new product development, refine existing products, generate market research, and develop concrete customer intelligence. A business analyst analyzes data such as financial data, sales data, marketing data, production data, industry data, and other supporting sources to generate reports. The final reports may contain charts, text, images and other information based on data from disparate data sources such as social media, product reviews, surveys, chat logs, contact center paper files, and other sources. The supporting data sources may be linked or included in the report.

It is the goal of the business analyst and report reviewer to derive actionable intelligence from the report in a minimal amount of time. The report reviewer may seek to refine product development, implement customer satisfaction strategies, or other business decisions. In making decisions, it is optimal to traverse the data tree from a top-level element to the underlying sources. As mentioned, these underlying, supporting data sources may be disparate, requiring time to follow the link to the remote source and distracting from the analysis necessary to make a decision. Further, internet access may not be available.

Electronic paper file formats such as the Portable Document Format (PDF) encapsulate a description of a fixed-layout flat document, including the text, fonts, graphics, and other information needed to display it so that information from remote sources may be incorporated in a single document. The PDF file format specification includes external and internal linking capabilities. However, it is deficient applying meaning structure and navigation for ready analysis of content contained therein. It would be advantageous for the art to have system and process for generating enhanced internally linked PDF reports according to a data tree based on report content contained therein.

SUMMARY

The present invention is directed to a system and process for electronic paper file generation from a report format and metafile such that a user may readily navigate the report objects within an enhanced electronic paper file. A reporting catalog module is configured to retrieve and report data from a selected data source and according to a report format, the reported data comprised of report objects. An image processing module is configured to render a base electronic paper file including the report objects, in a visual format according to the selected report format. The image processing module is further configured to parse the report objects in and generate a metafile, the metafile including an identifier and position information within the electronic paper file for the report objects. A link module is configured to parse the metafile and create relational information among the report objects. The link module is further configured to retrieve position information for a related target report object and generate a navigational link from a source report object to the target report object.

These and other features, aspects, and advantages of the invention will become better understood with reference to the following description, appended claims, and accompanying drawings.

DETAILED DESCRIPTION

While the foregoing detailed description has disclosed several embodiments of the invention, it is to be understood that the above description is illustrative only and not limiting of the disclosed invention. It will be appreciated that the discussed embodiments and other unmentioned embodiments may be within the scope of the invention.

Systems and methods for creating interactive reports are described which allow users to review them in offline mode. A data tree is created defining a hierarchical relationship between graphs, charts, topics, text, supporting data sources, and elements therein for presentation in the report, enabling users to navigate from one object to another by clicking on object in the graphs, charts, topics. Charts, graphs, and tables in the report are processed according to the data tree and linked according their relationship, so that a user can readily traverse report data according to their levels in the data tree in the report by actuating the links.

Figure 1:
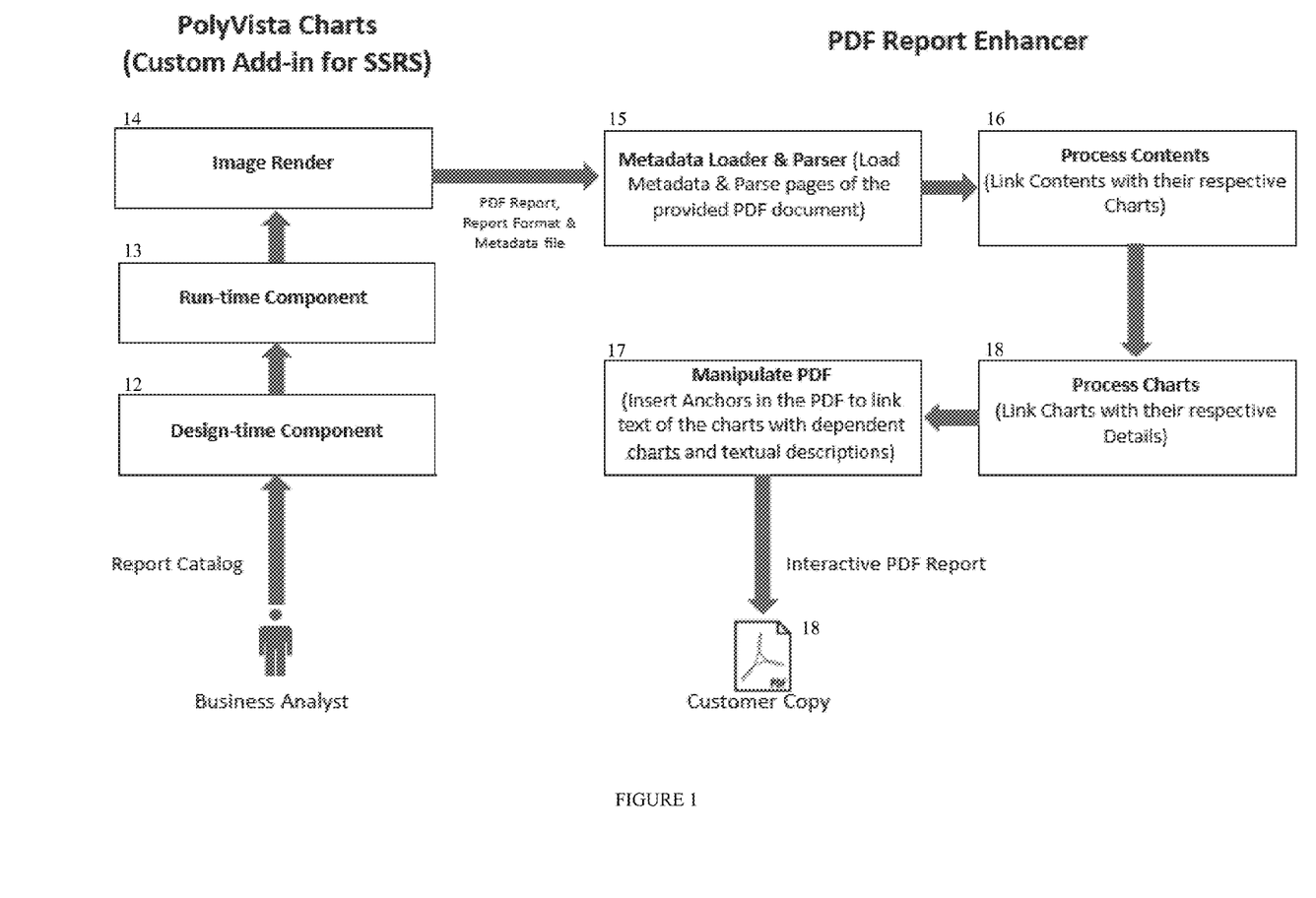
FIG. 1 shows a combined block diagram and flow diagram of an embodiment according to the current invention.

The current invention is directed to a system and process for generating an enhanced internally linked report in an electronic paper format report. FIG. 1 depicts the major elements and steps of an embodiment of the invention. Depicted are a report catalog module 11, an image processing module 21, a metadata processing module 31, and a linking module 41 51 61. In the depicted process, a data source for reporting and a base report format from the report catalog module 12 are selected. The image processing module 21 generates a base electronic paper file report and a metadata file, the metadata file having position information for the report objects. The metadata processing module 31 retrieves the position information for the report objects. The linking module 41 51 61 creates the positional links between the reports objects and applies an overlay link layer to the related report objects. More consideration will be given to those steps below.

In exemplary configuration, the modules are carried out on a computer. A computer or server, generally refers to a system which includes a processor, memory, a screen, a network interface, storage, and input/output (I/O) components connected by way of a data bus. The I/O components may include for example, a mouse, keyboard, buttons, or a touchscreen. A server contains various server software programs and preferably contains application server software. Those skilled in the art will appreciate that the computer or servers can take a variety of configurations, including personal computers, hand-held devices, multi-processor systems, microprocessor-based electronics, network PCs, minicomputers, mainframe computers, and the like. Additionally, the computer may be part of a distributed computer environment where tasks are performed by local and remote processing devices that are communicatively linked. One skilled in the art can understand that the structure of and functionality associated with the aforementioned elements can be optionally partially or completely incorporated within one or the other, such as within one or more processors.

Figure 11:
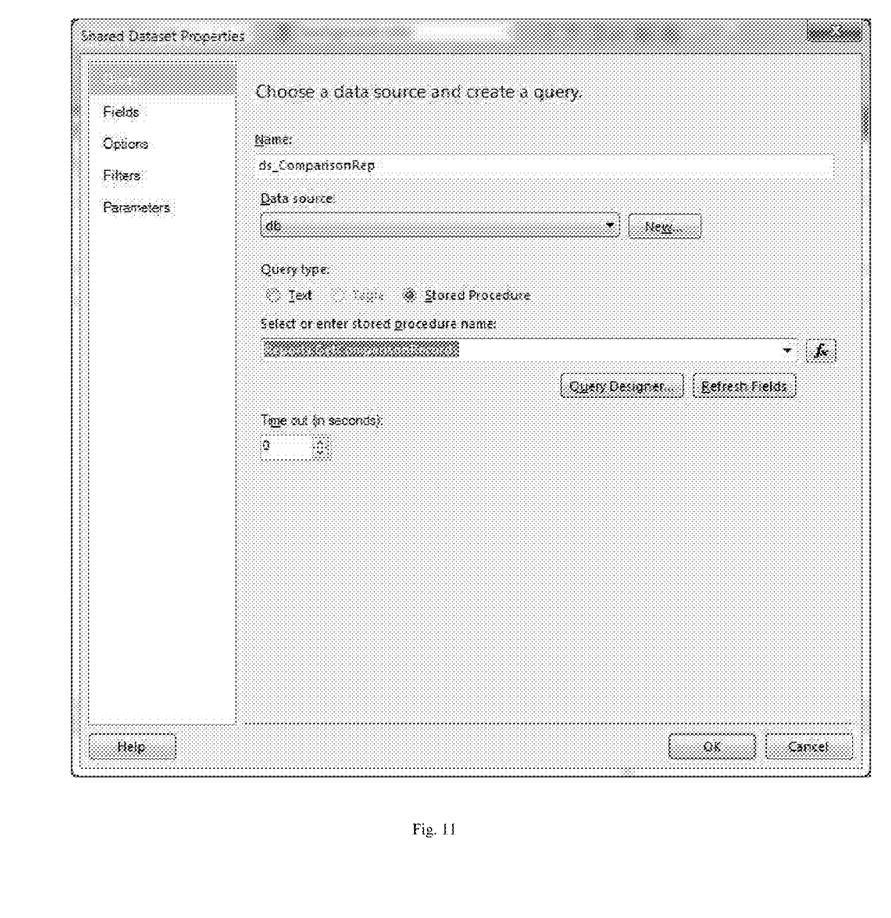
FIG. 11 shows a representative interface of the reporting module of FIG. 1.
Figure 12:
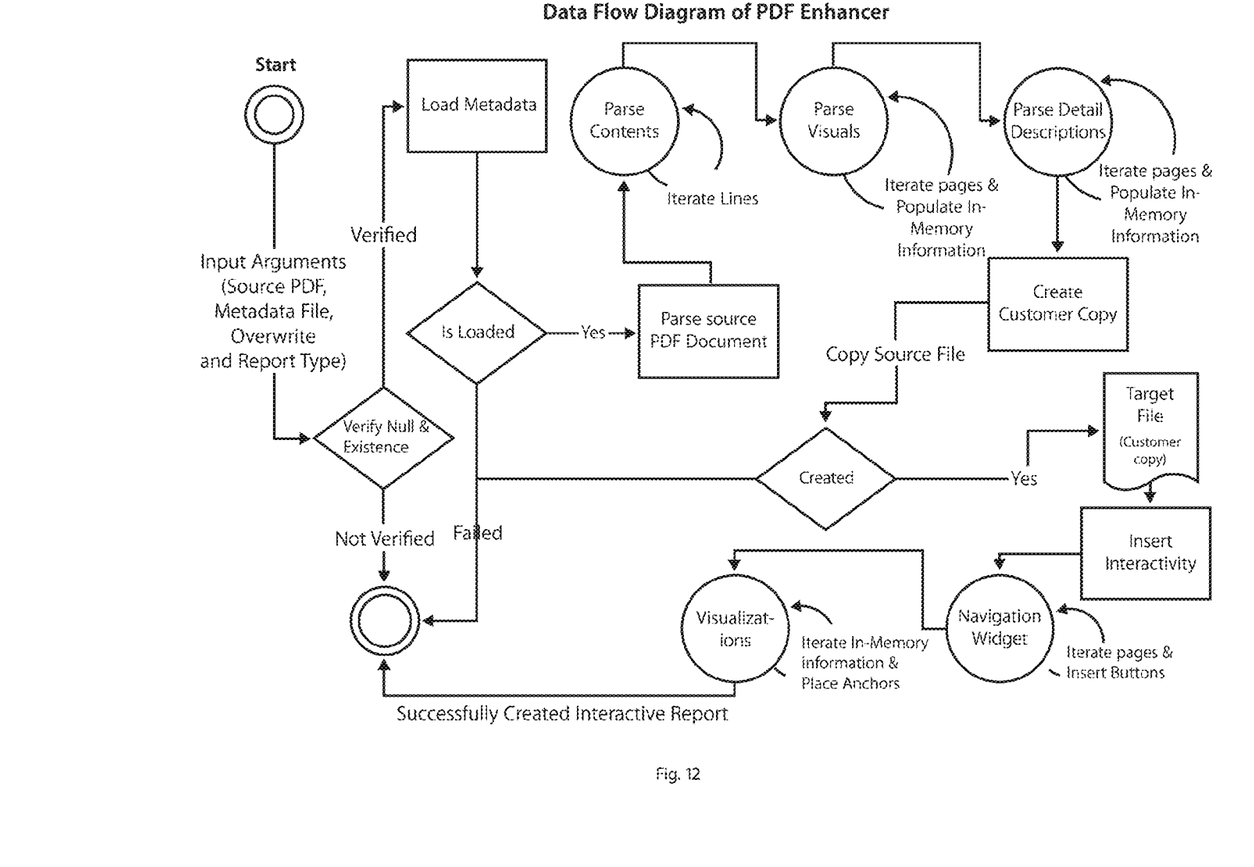
FIG. 12 shows a flow diagram of an embodiment according to the current invention.

Initially, a user selects a data source and report template for reporting. FIG. 11 depicts a representative interface. The data source contains unstructured, related data. One skilled in the art would appreciate that the data source may reside in one or more databases, tables, or computers. Representative suitable database systems include MySQL, PostgreSQL, SQLite, Microsoft SQL Server, Oracle, dBASE, flat text, or the like. It is within the scope of the invention for the data source to include pointer to or data retrieved over a network. The illustrated data set includes rows of wireless phone customer call center data, including the reason for the call, the sentiment of the caller, the caller's phone plan, and the reason for the call. This illustrated data set will be used to further explain the principles necessary to carry out the invention, but it should be appreciated that other data sources could be processed by the system.

The user selects a report format from the report catalog module 12. A set of template reports are presented to the user for selection. Example selections include those which sorted, grouped, and totaled or subtotaled for selected fields within the data source. For example, the illustrated call center data source of FIG. 8a may include sorting and grouping by categorized reason for the call, subgrouping by caller sentiment followed by totals for the reason for the call. The report catalog module 12 outputs a list of report objects 28. Report objects 28 include, but are not limited to, charts, graphs, text (representing categories, annotations, totals, or other report data), raw supporting data, and the like. Each report object 28 is enumerated independently and can have its own attributes.

Figure 2:
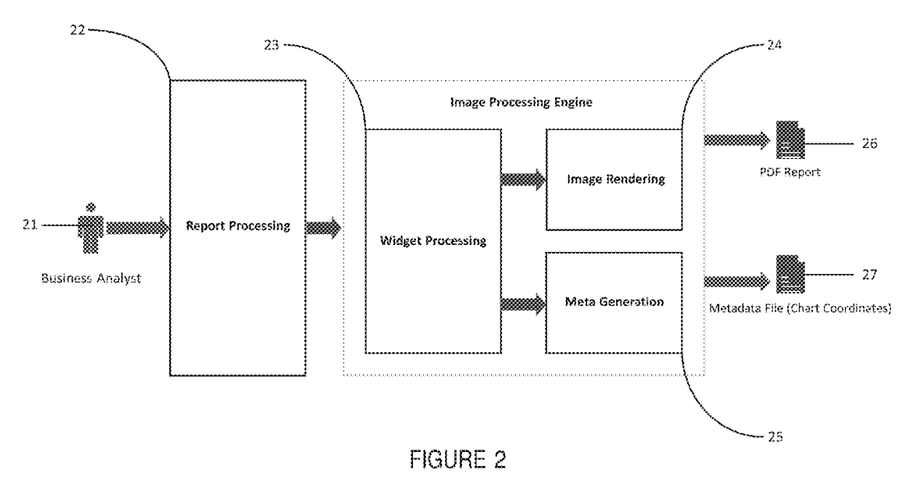
FIG. 2 shows a flow diagram of the image processing module of FIG. 1.
Figure 3:
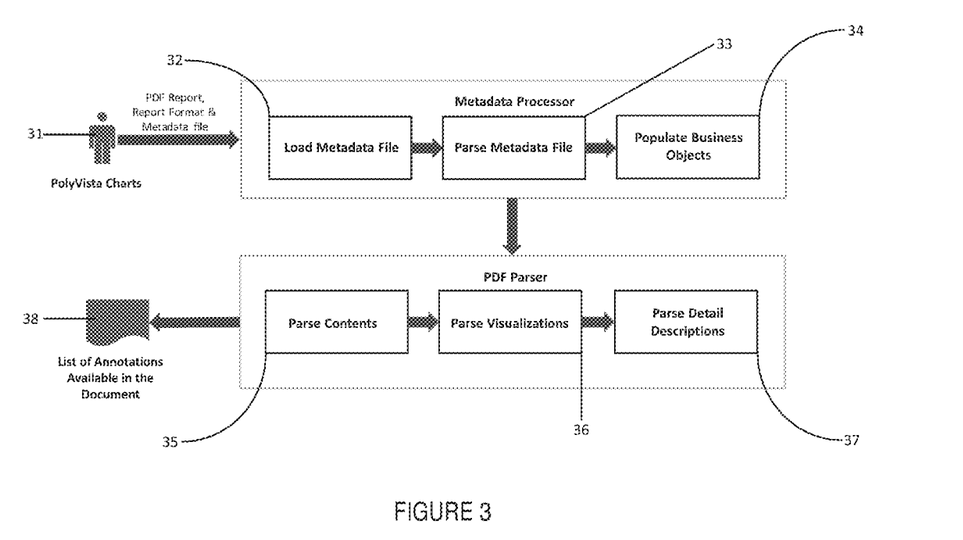
FIG. 3 shows a flow diagram of the metadata processing module of FIG. 1.
Figure 4:
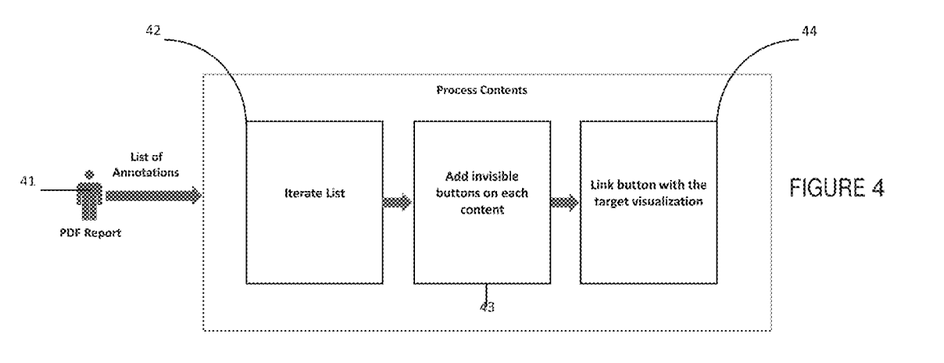
FIG. 4 shows a flow diagram of aspects of the linking module of FIG. 1.
Figure 5:
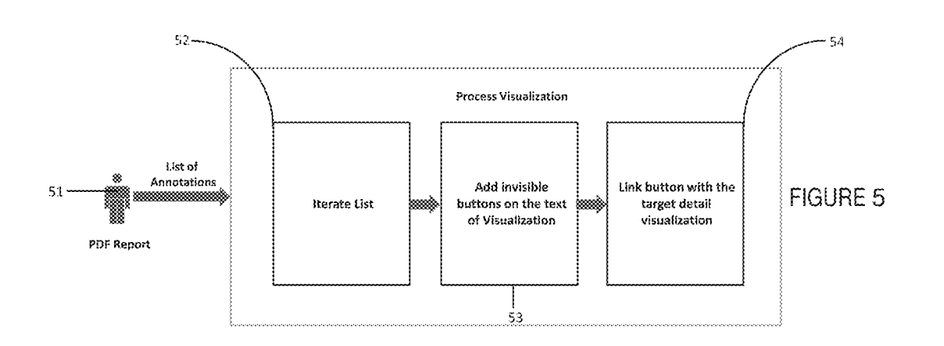
FIG. 5 shows a flow diagram of alternate aspects of the linking module of FIG. 1.
Figure 6:
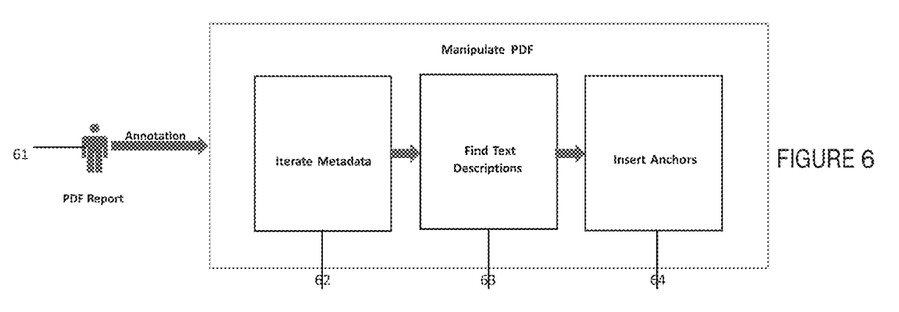
FIG. 6 shows a flow diagram of alternate aspects of the linking module of FIG. 1.

Referring to FIGS. 2 and 3, the image processing module 21 generates a base electronic paper file report 26 and an associated metadata file 27. The image processing module 21 retrieves the report objects 28 (FIGS. 8a & 9a), renders them into an image 24 corresponding to the report format passed from the report catalog module 12. The image output is a visual depiction of the report objects 28 in an electronic paper file format. The exemplary electronic paper file format is the Portable Document Format (PDF). The PDF file format encapsulates a complete description of a fixed-layout flat document, including the text, fonts, graphics, and other information needed to display it. It is also within the scope of this invention to employ the XML Paper Specification (XPS) or similar electronic paper file formats.

Figure 8A:
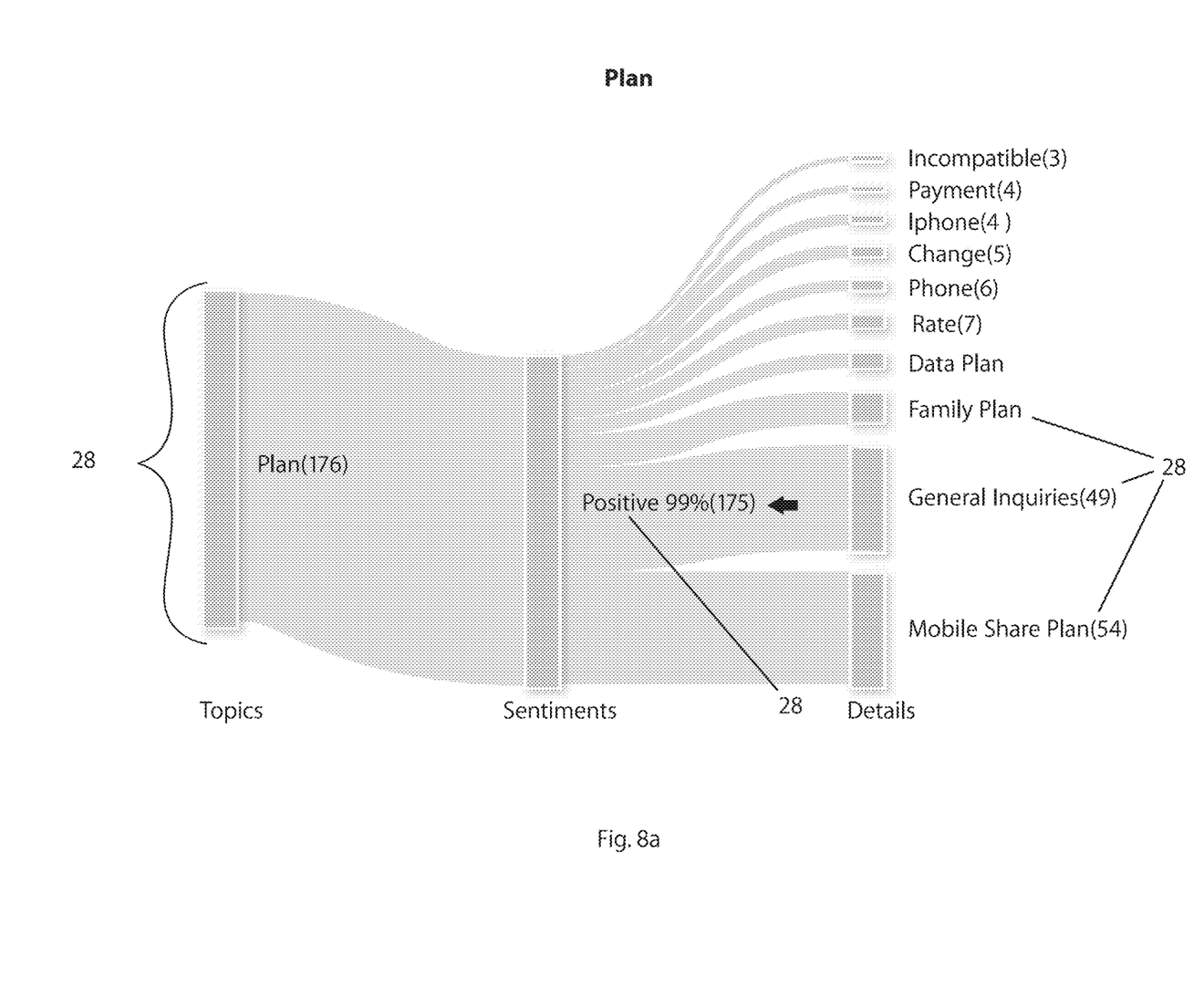
FIG. 8a shows a partial data visualization employed in the embodiment of FIG. 1 prior to linking module processing.
Figure 9A:
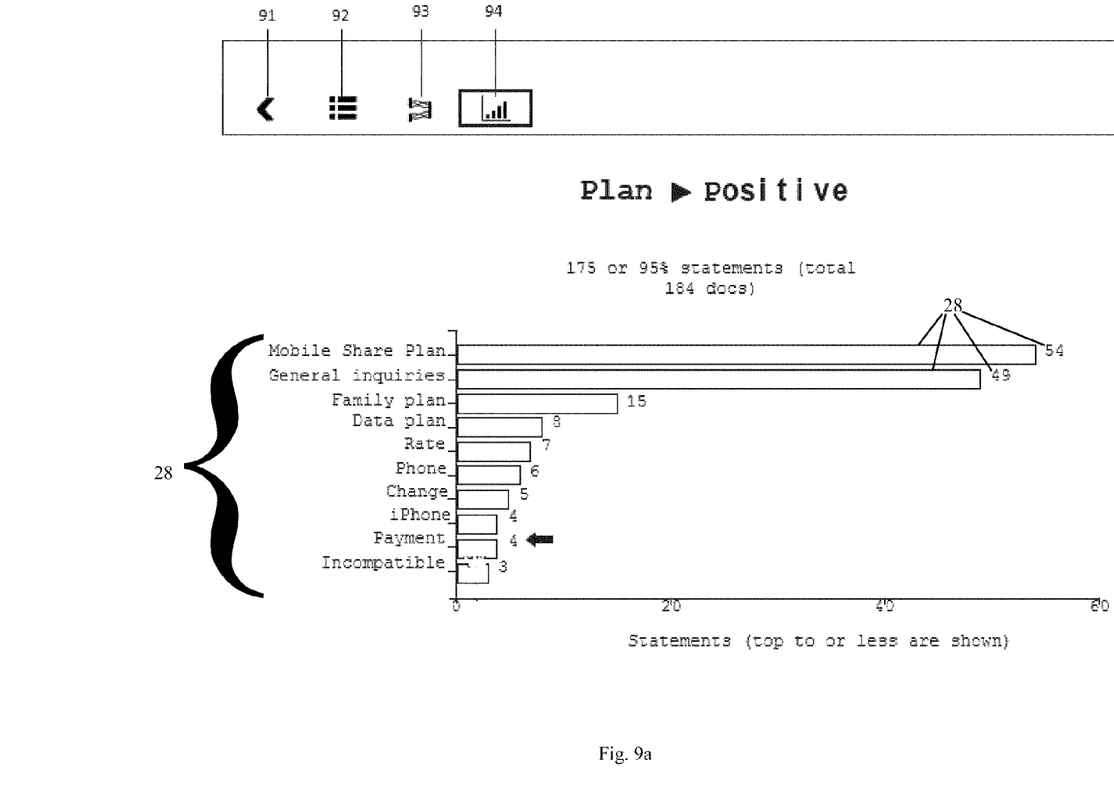
FIG. 9a shows an alternate partial data visualization employed in the embodiment of FIG. 1 prior to linking module processing.
Figure 10:
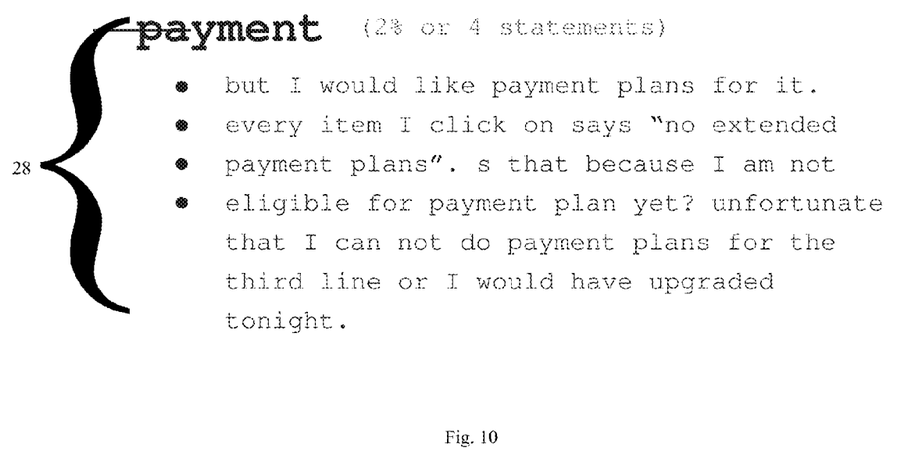
FIG. 10 shows representative supporting data employed in the embodiment of FIG. 1.

Concurrent with the electronic paper file generation, the image processing module 21 creates a related metadata file 27 having position information for report objects 28. FIGS. 8a, 9a, and 10 depict representative partial output of the electronic paper format from the image processing module 21. Depicted are a plurality of report objects 28, including chart objects, chart element objects, chart element text objects, and a supporting data object. For visual clarity, not all report objects are referenced by number. As the visual representations of the report objects 28 are rendered, an identifier and coordinates of their placement within the electronic paper file are stored, resulting in a metadata file 27 having a list of report objects and their position. The boundaries of the report object 28 may be represented by dimension data, coordinates of the bounds, or other data formats known in the arts. In exemplary configuration, the metadata file is stored in a JavaScript Object Notation (JSON) format.

The metadata file and electronic paper file are each retrieved. The metadata file and electronic paper file are then parsed 33 36. The image processing module 21 outputs an electronic paper file having the report objects 28, including text report objects 28. FIGS. 8a, and 9a depict partial representative output of the electronic paper file at the conclusion of image processing.

Figure 7A:
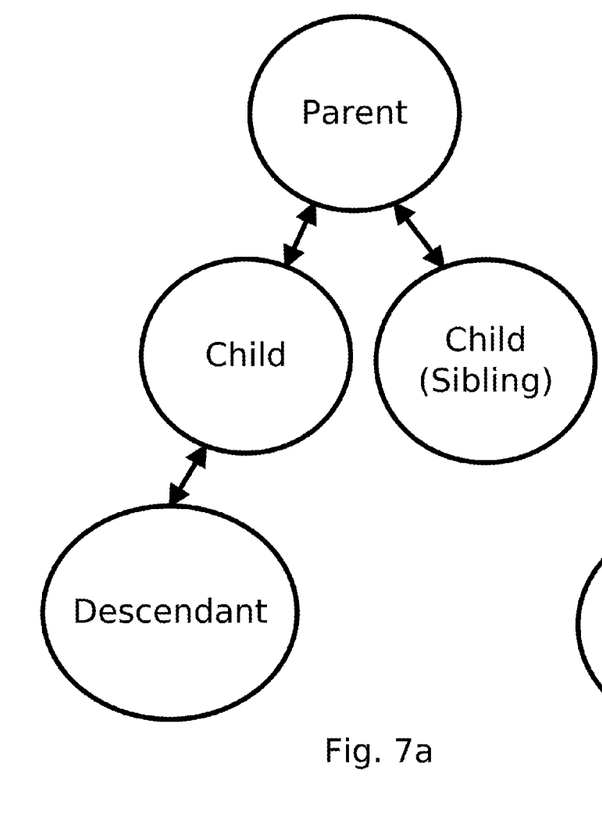
FIGS. 7a and 7b show representative data structure and types of employed in the embodiment of FIG. 1.
Figure 7B:
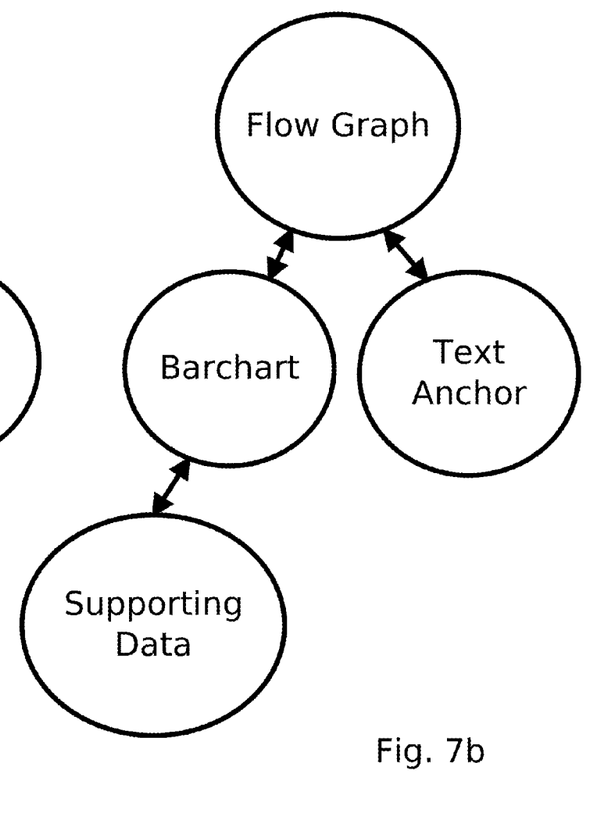

Now referring to FIGS. 4, 5, 7a, and 7b, the linking module 41 51 61 creates the relational links between related reports objects 28 and applies an overlay link layer 30 to those related report objects 28. Referring to FIGS. 7a, and 7b, the linking module 41 51 module initially applies a hierarchical relationship to the report objects 28. In exemplary configuration, the linking module 41 51 applies a data tree structure to the report objects 28. In general, a data tree structure similar to that of FIG. 7a is applied. A parent object is linked to one or more child objects. The child object may be further linked to descendants. FIG. 7b depicts a sample data tree structure applied to a report format. A flow graph element report object 28 (for example, "General Inquiries" section of FIG. 8a) is the parent of a child bar chart element report object 28 (for example, "General Inquiries" section of FIG. 9a) which, in turn, is the parent of descendant supporting data report object 28 (for example, "Payment" block of FIG. 10). The illustrated flow graph element report object 28 and bar chart element report object 28 both have sibling "General Inquiries" text annotation report objects 28. The linking module 41 51 iterates 42 52 through the report objects 28 list to build the complete list of relationships between the report objects 28.

Figure 8B:
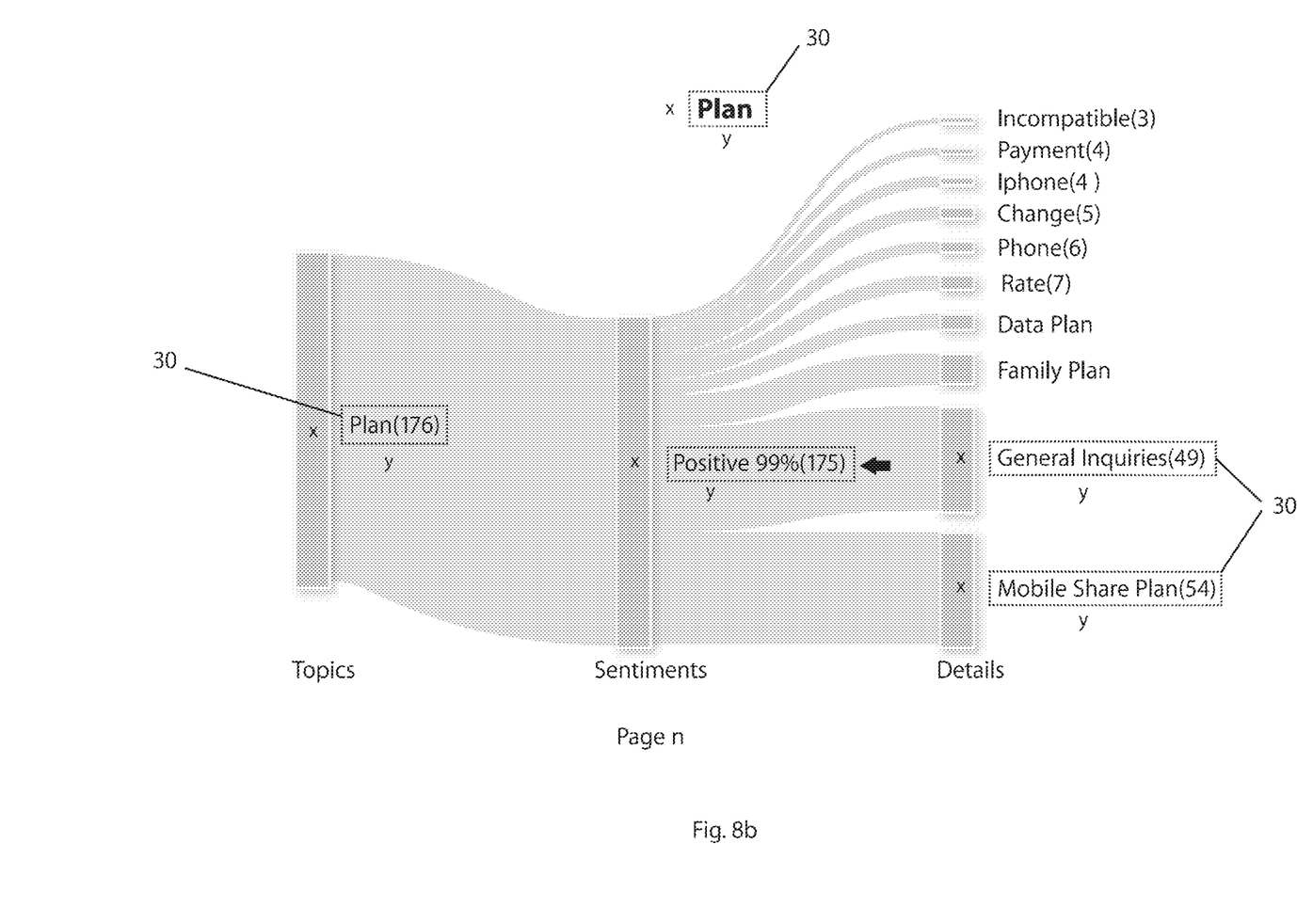
FIG. 8b shows a partial data visualization employed in the embodiment of FIG. 1 after linking module processing.
Figure 9B:
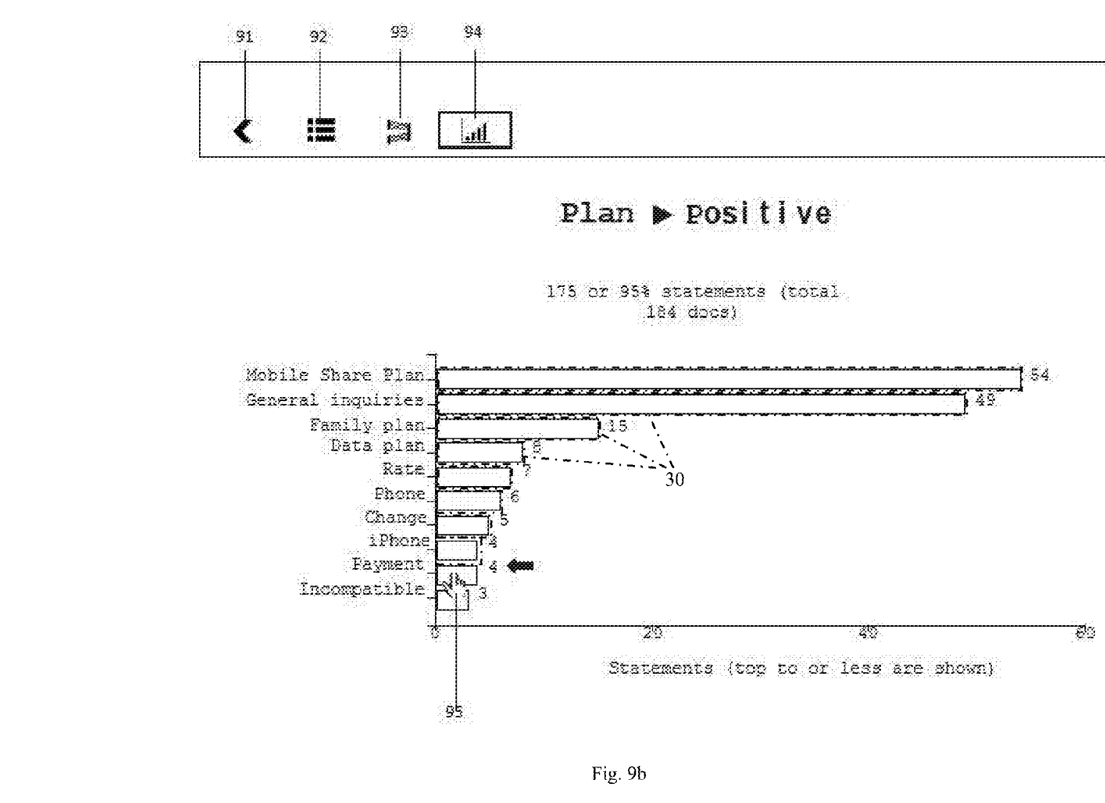
FIG. 9b shows an alternate partial data visualization employed in the embodiment of FIG. 1 after linking module processing.

Referring to FIGS. 4, 5, 8b, and 9b, after the list of relationships between the report objects 28 is generated, the linking module 41 51 61 applies navigation links to those report objects 28. The linking module 41 51 61 iterates the list 42 52 62 of relationships between the report objects 28. Where there is a relationship, the coordinates of the related object 28 are retrieved 44 54 from the metadata file 27. A link layer 30 is applied enabling navigation from the source report object 28 to the target report object 28 using the link functionality of the electronic paper file format. In exemplary configuration, a link layer 30 includes an invisible button 43 53 and a text annotation report object 28. The depicted text annotation 63 report object 28 is retrieved as a sibling report object 28 in the data tree. The link layer 30 is overlaid on the source report object 28 to completion the linking 64. In some cases, a report object 28 can have both a parent and a child relationship. In one configuration, the linking module 41 51 61 defaults to the linking to the child report object 28 such that a user is traversing "down the tree." In an alternate configuration, the linking module 41 51 61 defaults to the linking to the parent report object 28 such that a user is traversing "up the tree." In yet another alternate configuration, the linking module 41 51 61 defaults to bi-directional links. In yet another alternate configuration, a navigation bar includes back buttons to navigate up one level 91, buttons to navigate to specific level 92 (typically a first or second level), buttons to navigate to the data tree itself 93, or buttons to navigate to a specific position in the report 95. FIGS. 8*b*, 9*b*, and 10 illustrate partial representative output of the electronic paper file at the conclusion of linking module 41 51 61 processing.

Having described the elements and processes, use of the embodiment is described. The user selects a data source and report format from an interface presented by the report catalog module 12. The image processing module 21 generates a base electronic paper file 26 and an associated metadata file 27. The linking module 41 51 61 processes the relationship between the report objects 28 creates navigational links 30 between the related reports objects and applies an overlay link layer to the related report objects 28, whereby the user may readily traverse the report elements in the modified electronic paper file.

Insofar as the description above and the accompanying drawing disclose any additional subject matter that is not within the scope of the single claim below, the inventions are not dedicated to the public and the right to file one or more applications to claim such additional inventions is reserved.

What is claimed is:

1. A system for generating an interactive report in an electronic paper file format comprising:
    a processor and memory executing a reporting catalog module, an image processing module, and a link module;
    said reporting catalog module configured to retrieve and report data from a selected data source and according to a report format, said reported data comprised of report objects within a report;
    said image processing module, configured to render a base electronic paper file including said report objects in a visual format according to the selected report format;
    said image processing module further configured to parse said report objects in and generate a metafile, said metafile including an identifier and position information within said electronic paper file for said report objects;
    said link module configured to parse said metafile and create relational information between said report objects, said relational information comprising a hierarchical relationship between report object pairs, said report object pairs comprising a source report object and a related target report object; and
    said link module further configured to retrieve a source report object and position information for its related target report object and generate a navigational link in the form of an overlay link layer from said source report object to said target report object, whereby a user can readily traverse report data in a single report according to their informational relationship by navigating said overlay link layers.

2. The system of claim 1, wherein said electronic paper format is the portable document format.

3. The system of claim 1, wherein said electronic paper format is the XML paper specification format.

4. The system of claim 1, wherein said metafile format employs a JavaScript Object Notation format.

5. The system of claim 1, wherein said position information comprises coordinates.

6. The system of claim 1, wherein said position information further comprises boundary information.

7. The system of claim 1, wherein said relational information comprises a data tree representing the hierarchical relationship among the report objects.

8. The system of claim 1, wherein said navigational link comprises an invisible button and text overlaid on said report object.

9. A process for generating an interactive report in an electronic paper file format comprising:
    providing a processor and memory executing a reporting catalog module, an image processing module, and a link module;
    said reporting catalog module configured to retrieve and report data from a selected data source and according to a report format, said reported data comprised of report objects within a report;
    said image processing module, configured to render a base electronic paper file including said report objects in a visual format according to the selected report format;
    said image processing module further configured to parse said report objects in and generate a metafile, said metafile including an identifier and position information within said electronic paper file for said report objects;
    said link module configured to parse said metafile and create relational information between said report objects, said relational information comprising a hierarchical relationship between report object pairs, said report object pairs comprising a source report object and a related target report object; and
    said link module further configured to retrieve a source report object and position information for its related target report object and generate a navigational link in the form of an overlay link layer from said source report object to said target report object, whereby a user can readily traverse report data in a single report according to their informational relationship by navigating said overlay link layers.

10. The method of claim 9, wherein said electronic paper format is the portable document format.

11. The method of claim 9, wherein said electronic paper format is the XML paper specific format.

12. The method of claim 9, wherein said metafile format employs a JavaScript Object Notation format.

13. The method of claim 9, wherein said position information comprises coordinates.

14. The method of claim 9, wherein said position information further comprises boundary information.

15. The method of claim 9, wherein said relational information comprises a data tree representing the hierarchical relationship among the report objects.

16. The method of claim 9, wherein said navigational link comprises an invisible button and text overlaid on said report object.

17. A system for generating an interactive report in an electronic paper file format comprising:
    providing a processor and memory executing a reporting catalog module, an image processing module, and a link module;

said reporting catalog module configured to retrieve and report data from a selected data source and according to a report format, said reported data comprised of report objects within a report;

said image processing module, configured to render a base Portable Document File including said report objects in a visual format according to the selected report format;

said image processing module further configured to parse said report objects in and generate a metafile, said metafile including an identifier and position information within said electronic paper file for said report objects, said position information comprises of coordinates;

said link module configured to parse said metafile and create relational information between said report objects, said relational information comprising a hierarchical relationship between report object pairs, said report object pairs comprising a source report object and a related target report object; and said link module further configured to retrieve a source report object and position information for its related target report object and generate a navigational link in the form of an overlay link layer from said source report object to said target report object, whereby a user can readily traverse report data in a single report according to their informational relationship by navigating said overlay link layers.

18. The system of claim 17, wherein said position information further comprises boundary information.

19. The system of claim 17, wherein said relational information comprises a data tree representing the hierarchical relationship among the report objects.

20. The system of claim 17, wherein said navigational link comprises an invisible button and text overlaid on said report object.

* * * * *